United States Patent
Yu et al.

(10) Patent No.: US 9,594,984 B2
(45) Date of Patent: Mar. 14, 2017

(54) BUSINESS DISCOVERY FROM IMAGERY

(71) Applicant: Google Inc., Mountain View, CA (US)

(72) Inventors: Qian Yu, Santa Clara, CA (US); Liron Yatziv, Sunnyvale, CA (US); Martin Christian Stumpe, Sunnyvale, CA (US); Vinay Damodar Shet, Millbrae, CA (US); Christian Szegedy, Sunnyvale, CA (US); Dumitru Erhan, San Francisco, CA (US); Sacha Christophe Arnoud, San Francisco, CA (US)

(73) Assignee: Google Inc., Mountain View, CA (US)

( * ) Notice: Subject to any disclaimer, the term of this patent is extended or adjusted under 35 U.S.C. 154(b) by 28 days.

(21) Appl. No.: 14/821,128

(22) Filed: Aug. 7, 2015

(65) Prior Publication Data

US 2017/0039457 A1 Feb. 9, 2017

(51) Int. Cl.
*G06K 9/00* (2006.01)
*G06K 9/66* (2006.01)
*G06K 9/62* (2006.01)
*G06N 3/08* (2006.01)

(52) U.S. Cl.
CPC ............ *G06K 9/66* (2013.01); *G06K 9/6201* (2013.01); *G06K 9/6256* (2013.01); *G06K 9/6277* (2013.01); *G06N 3/08* (2013.01)

(58) Field of Classification Search
CPC ...... G06K 9/66; G06K 9/6256; G06K 9/6277; G06K 9/6201; G06K 3/08
USPC .......................................................... 382/156
See application file for complete search history.

(56) References Cited

U.S. PATENT DOCUMENTS

| 8,965,112 B1* | 2/2015 | Ibarz ............................. 382/105 |
| 2016/0140425 A1* | 5/2016 | Kulkarni ............. G06K 9/4628 382/159 |
| 2016/0259980 A1* | 9/2016 | Mlybari ............. G06K 9/00778 |

OTHER PUBLICATIONS

Dean, J., et al., Large scale distributed deep networks, Advances in Neural Information Processing Systems 25, pp. 1223-1231, 2012.
Erhan, D., et al., Scalable object detection using deep neural networks, 2014 IEEE Conference on Computer Vision and Pattern Recognition (CVPR), pp. 2155-2162, 2014.
Girshick, et al., Rich feature hierarchies for accurate object detection and semantic segmentation, Proceedings of the IEEE Conference on Computer Vision and Pattern Recognition (CVPR), 2014.
Goodfellow, I.J., et al., Multi-digit number recognition from street view imagery using deep convolutional neural networks, arXiv preprint arXiv: 132.4389, 2013.

(Continued)

*Primary Examiner* — Daniel Mariam
(74) *Attorney, Agent, or Firm* — Lerner, David, Littenberg, Krumholz & Mentlik, LLP (57) ABSTRACT

Aspects of the present disclosure relate to a method includes training a deep neural network using training images and data identifying one or more business storefront locations in the training images. The deep neural network outputs tight bounding boxes on each image. At the deep neural network, a first image may be received. The first image may be evaluated using the deep neural network. Bounding boxes may then be generated identifying business storefront locations in the first image.

20 Claims, 6 Drawing Sheets

300

(56) References Cited

OTHER PUBLICATIONS

Seung-Seok Choi et al., "A Sruvey of Binary Similarity and Distance Measures", 2010, <http://citeseerx.ist.psu.edu/viewdoc/download?doi=10.1.1.352.6123&rep=rep1&type=pdf>.
Simonyan et al., "Very Deep Convolutional Networks for Large-Scale Image Recognition", Published as a conference paper at ICLR 2015, arXiv:1409.1556v6 [cs.CV] Apr. 10, 2015, <http://arxiv.org/pdf/1409.1556.pdf>.

* cited by examiner

BUSINESS DISCOVERY FROM IMAGERY

BACKGROUND OF THE INVENTION

The abundance of geo-located street level photographs available on the internet today provides a unique opportunity to detect and monitor man-made structures to help build precise maps. Examples of such structures may include local businesses such as restaurants, clothing stores, gas stations, pharmacies, laundromats, etc. There is a high degree of consumer interest in searching for such businesses through local relevant queries on popular search engines. Accurately identifying the existence of such local businesses worldwide is a non-trivial task.

BRIEF SUMMARY OF THE INVENTION

Aspects of the disclosure provide for a method. The method includes training, using one or more computing devices, a deep neural network using a set of training images and data identifying one or more business storefront locations in the training images, the deep neural network outputting a first plurality of bounding boxes on each training image; receiving, using the one or more computing devices, a first image; evaluating, using the one or more computing devices and a deep neural network, the first image; and generating, using the one or more computing devices and the deep neural network, a second plurality of bounding boxes identifying business storefront locations in the first image.

In one example, the method also includes detecting, using the one or more computing devices and the deep neural network, business information at each of the identified business storefront locations; and updating, using the one or more computing devices, a database of business information by adding information from each bounding box in the second plurality of bounding boxes with the business information detected at the business storefront location identified by the bounding box. In this example, the method also includes receiving, using the one or more computing devices, a request from a user for business information; and retrieving, using the one or more computing devices, the requested business information from the updated database.

In another example, the second plurality of bounding boxes includes two bounding boxes arranged side by side in the first image identifying two discrete business storefront locations. In one example, training the deep neural network further includes applying a coarse sliding window on a portion of a given training image; and removing one or more bounding boxes based on a location of the portion of the given training image. In another example, generating the second plurality of bounding boxes also includes applying a coarse sliding window on a portion of the first image; and removing one or more bounding boxes based on a location of the portion of the given training image.

In yet another example, training the deep neural network also includes determining a confidence score for each bounding box that represents a likelihood that the bounding box contains an image of a business storefront; and removing bounding boxes corresponding to bounding boxes with a confidence score less than a set threshold. In a further example, generating the second plurality of bounding boxes also includes determining confidence scores for each bounding box that represents a likelihood that the bounding box contains an image of a business storefront; and removing bounding boxes locations corresponding to bounding boxes with a confidence score less than a set threshold. In another example, training the deep neural network also includes using post-classification; and generating the second plurality of bounding boxes further comprises using post-classification.

In a further example, generating the second plurality of bounding boxes also includes calculating a probability of a given bounding box containing a business storefront; ranking the second plurality of bounding boxes based on the calculated probability; and removing one or more bounding boxes based on the ranking. In yet another example, generating the second plurality of bounding boxes also includes removing objects in the second plurality of bounding boxes that obstructs the view of the identified business storefront locations. In another example, training images and the first image are panoramic.

Another aspect of the disclosure provides a system. The system includes a deep neural network and one or more computing devices. The one or more computing devices are configured to train the deep neural network using a set of training images and data identifying one or more business storefront locations in the training images, the deep neural network outputting a first plurality of bounding boxes on each training image; receive, at the deep neural network, a first image; evaluate, using the deep neural network, the first image; and generate, using the deep neural network, a second plurality of bounding boxes identifying business storefront locations in the first image.

In one example, the one or more computing devices are also configured to train the deep neural network by applying a coarse sliding window on a portion of a given training image, and removing one or more bounding boxes based on a location of the portion of the given training image. In another example, the one or more computing devices are also configured to generate the second plurality of bounding boxes by applying a coarse sliding window on a portion of the first image, and removing one or more bounding boxes based on a location of the portion of the given training image.

In yet another example, the one or more computing devices are also configured to train the deep neural network by determining a confidence score for each bounding box that represents a likelihood that the bounding box contains an image of a business storefront; and removing bounding boxes corresponding to bounding boxes with a confidence score less than a set threshold. In a further example, the one or more computing devices are also configured to generate the second plurality of bounding boxes by determining confidence scores for each bounding box that represents a likelihood that the bounding box contains an image of a business storefront, and removing bounding boxes locations corresponding to bounding boxes with a confidence score less than a set threshold. In another example, the one or more computing devices are also configured to train the deep neural network by using post-classification, and generate the second plurality of bounding boxes by using post-classification.

In a further example, the one or more computing devices are also configured to generate the second plurality of bounding boxes by calculating a probability of a given bounding box containing a business storefront; ranking the second plurality of bounding boxes based on the calculated probability; and removing one or more bounding boxes based on the ranking. In yet another example, the one or more computing devices are also configured to generate the second plurality of bounding boxes by removing objects in the second plurality of bounding boxes that obstructs the view of the identified business storefront locations.

A further aspect of the disclosure provides a non-transitory, tangible computer-readable storage medium on which computer readable instructions of a program are stored. The instructions, when executed by one or more computing devices, cause the one or more computing devices to perform a method. The method includes training a deep neural network using a set of training images and data identifying one or more business storefront locations in the training images, the deep neural network outputting a first plurality of bounding boxes on each training image; receiving, at the deep neural network, a first image; evaluating, using the deep neural network, the first image; and generating, using the deep neural network, a second plurality of bounding boxes identifying business storefront locations in the first image.

DETAILED DESCRIPTION

Overview

The technology relates to automatically generating bounding boxes that identify distinct business storefronts in images. In other words, a single convolutional network evaluation may be used to directly predict multiple bounding boxes together with their confidence scores. Using deep learning in a convolutional neural network and post-classification, storefronts in panoramic images may be identified with higher accuracy and speed than with other methods. Accurate detection and segmentation of business storefronts provides opportunities in post-processing to extract information about a particular business. For example, text and images may be extracted to provide information about an identified business which may be used, in some cases, to more precisely determine the location of a business.

Extracting arbitrary business store fronts from street level photographs is a hard problem. The complexity comes from the high degree of intra-class variability in the appearance of store fronts across business categories and geographies, inherent ambiguity in the physical extent of the store front, businesses abutting each other in urban areas, and the sheer scale of the occurrence of store fronts worldwide. These factors make this an ambiguous task even for human annotators. Image acquisition factors such as noise, motion blur, occlusions, lighting variations, specular reflections, perspective, geolocation errors, etc. further contribute to the complexity of this problem. There are probably hundreds of millions of businesses worldwide and there could be billions of street level imagery. Given the scale of this problem and the turnover rate of businesses, manual annotation is prohibitive and not a sustainable solution. For automated approaches, runtime efficiency is highly desirable for detecting businesses worldwide in a reasonable time-frame.

Detecting business store fronts is the first and most critical step in a multi-step process to extract usable business listings from imagery. Precise detection of store fronts enables further downstream processing such as geolocation of the store front, OCR of the text, extraction of business name and other attributes, category classification, etc.

A convolutional neural network may be used to detect business store fronts in images. Convolutional networks are neural networks that contain sets of nodes with tied parameters. Increases in size of available training data and availability of computational power, combined with algorithmic advances such as piecewise linear units and dropout training have resulted in major improvements in many computer vision tasks. On immense datasets, such as those available today for many tasks, overfitting is not a concern; increasing the size of the network provides gains in testing accuracy. Optimal use of computing resources becomes a limiting factor. To this end, a distributed, scalable implementation of deep neural networks may be used.

Traditionally, object detection is performed by exhaustively searching for an object of interest in the image. Such approaches produce a probability map corresponding to the existence of the object at that location. Post-processing of this probability map, either through non-maxima suppression or mean-shift based approaches, then generates discrete detection results. To counter the computational complexity of exhaustive search, a selective search that uses image segmentation techniques to generate several proposals may drastically cut down the number of parameters to search over.

The technology disclosed herein uses a deep neural network to assign the final detection scores and adopts a fully learnt approach from pixels to discrete bounding boxes. The end-to-end learnt approach has the advantage that it integrates the proposal generation and post-processing using a single network to predict a large number of proposals and confidences at the same time. Relying on the confidence output of this approach alone may produce high quality results, but the precision may be pushed further by running extra dedicated post-classifier networks for the highest confidence proposals. Even with the extra post-classification stage, this technology can be orders of magnitude faster than its predecessors.

To train the deep neural network, a set of training images and data identifying one or more business storefront locations may be used. Using the training images, the deep neural network may output a first plurality of bounding boxes together with their respective confidence scores. The confidence scores of each bounding box may represent a likelihood that a bounding box contains an image of a business storefront. Each bounding box may be matched with a business storefront location. In training, a training image may be evaluated using a coarse sliding window, also called multi-crop evaluation. To further train the deep neural network, post-classification may be applied to refine the results of the multi-crop evaluation. Post-classification may include calculating a probability of a given bounding box containing a business storefront.

The trained deep neural network may receive an image to be evaluated. Features of the image may be identified and evaluated using multi-crop evaluation and post-classification. Based on the evaluation, the deep neural network may generate a second plurality of bounding boxes identifying possible business storefront locations with each bounding box may contain an image of only one business storefront.

Example Systems

Figure 1:
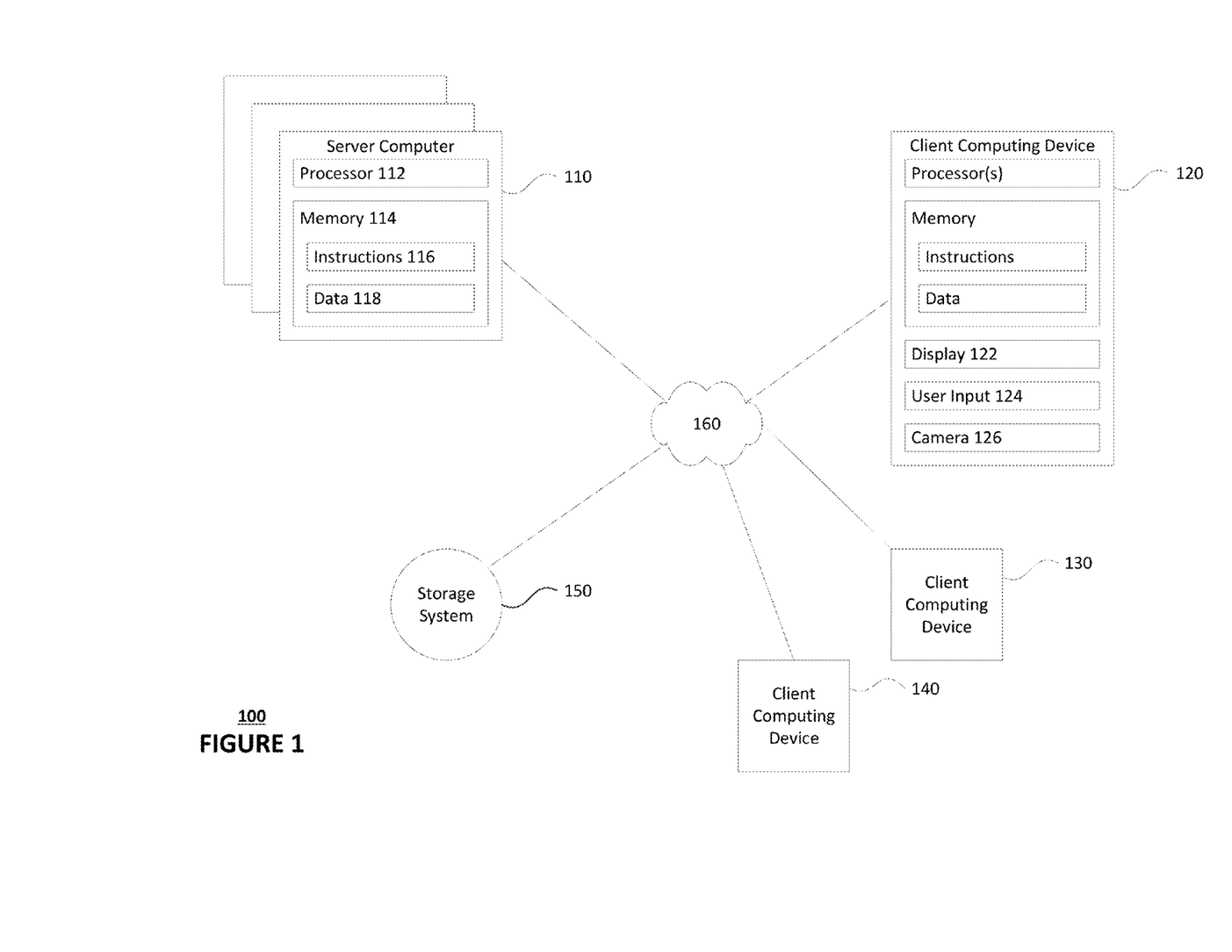
FIG. 1 is a functional diagram of an example system in accordance with aspects of the disclosure.
Figure 2:
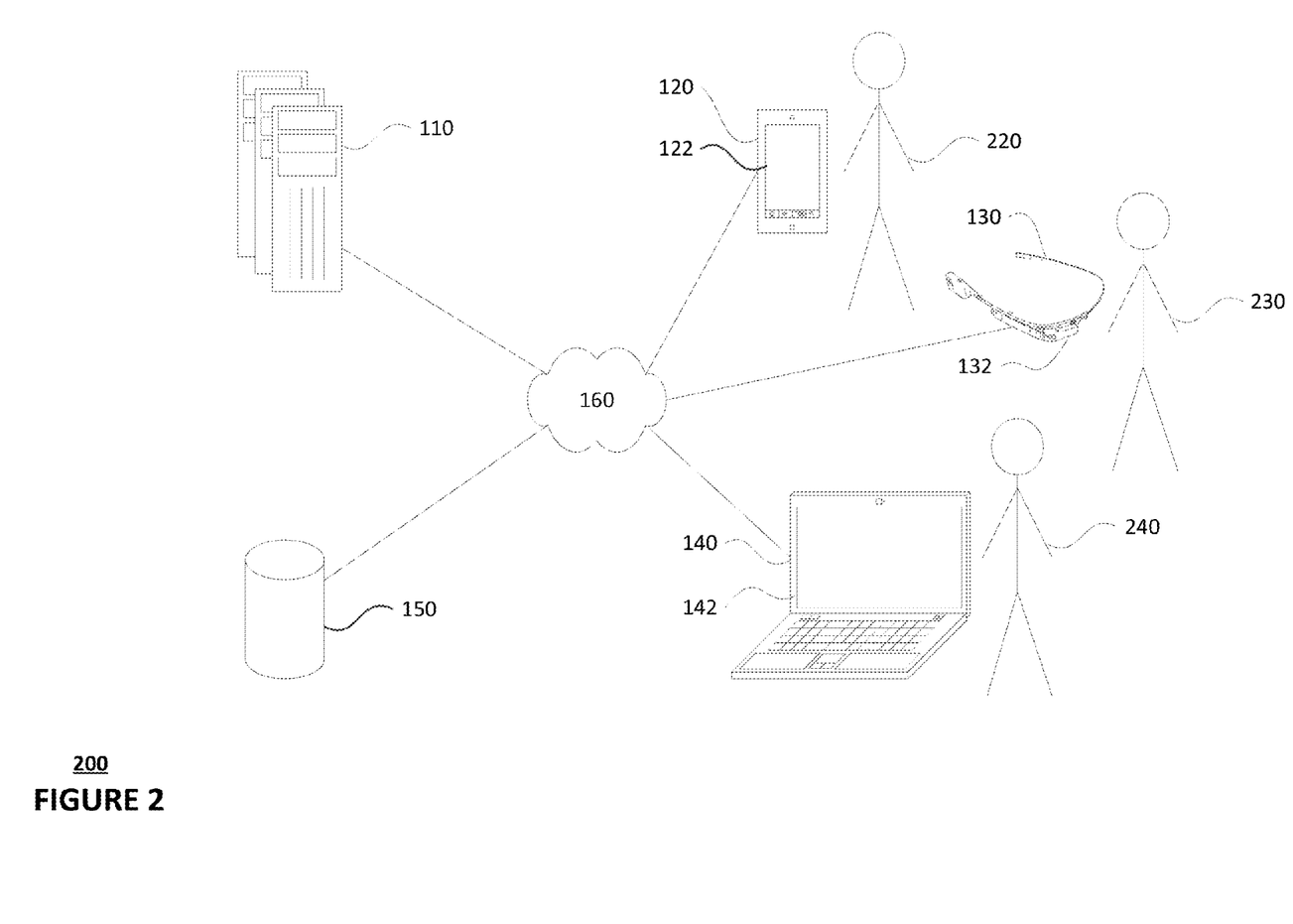
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include one or more computing devices 110, 120, 130, and 140 as well as storage system 150. Each of computing devices 110 can contain one or more processors 112, memory 114 and other components typically present in general purpose computing devices. Memory 114 of computing device 110 can store information accessible by the one or more processors 112, including instructions 116 that can be executed by the one or more processors 112.

Memory 114 can also include data 118 that can be retrieved, manipulated or stored by the processor. Data may include images. The images may be panoramic images or images having fields of view greater than 180 degrees, e.g., up to 360 degrees. In addition, the panoramic image may be spherical, or nearly spherical. Images may depict various business storefronts associated with information regarding the location of each business storefront within each image. The information may identify a range of pixels that depict a single business storefront; for example, some images may contain bounding boxes located on the image where each business storefront is. A number of these images may be identified as training images. Other images that are not associated with information regarding locations of business storefronts may also be stored in the memory. Data may also include the geolocation of each business storefront. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by a processor, or in any other computing device language including scripts or collections of independent source code modules that are interpreted on demand or compiled in advance. The instructions may include instructions that cause one or more computing devices such as computing device 110 to behave as a deep neural network. Functions, methods and routines of the instructions are explained in more detail below.

Data 118 can be retrieved, stored or modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 160.

Each of the computing devices 110 can be at different nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160. The network 160 may be a deep neural network that employs multiple layers of models, where the outputs of lower layers are used to construct the outputs of higher level layers. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120, 130, and 140 via the network. For example, one or more of server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described herein.

Each of the client computing devices may be configured similarly to the server computing devices 110, with one or more processors, memory and instructions as described above. Each client computing device 120, 130 or 140 may be a personal computing device intended for use by a user 220, 230, 240, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch screen or microphone). The client computing device may also include a camera 126 for capturing still images or recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to or incorporated into the memory of any of the computing devices 110-140 (not shown).

Storage system 150 may also store images. These images may include various types of images such as panoramic images or images having fields of view greater than 180 degrees, e.g., up to 360 degrees, that depict, among other things, one or more business storefronts. In some examples, a given image may be associated with storefront information identifying the location of each business storefront within that given image. For example, the storefront information for a given image may include a range or ranges of pixels in the given image that correspond to one or more storefronts and/or image coordinates corresponding to a shape of one or more business storefronts in the given image. As an example, the storefront information may be represented by bounding boxes corresponding to each business storefront location in the image. At least some of the images may be identified as training images as discussed below. The storage system 150 may also include geolocation information, or information regarding geographical location, for a number of business storefronts.

Example Methods

Figure 3:
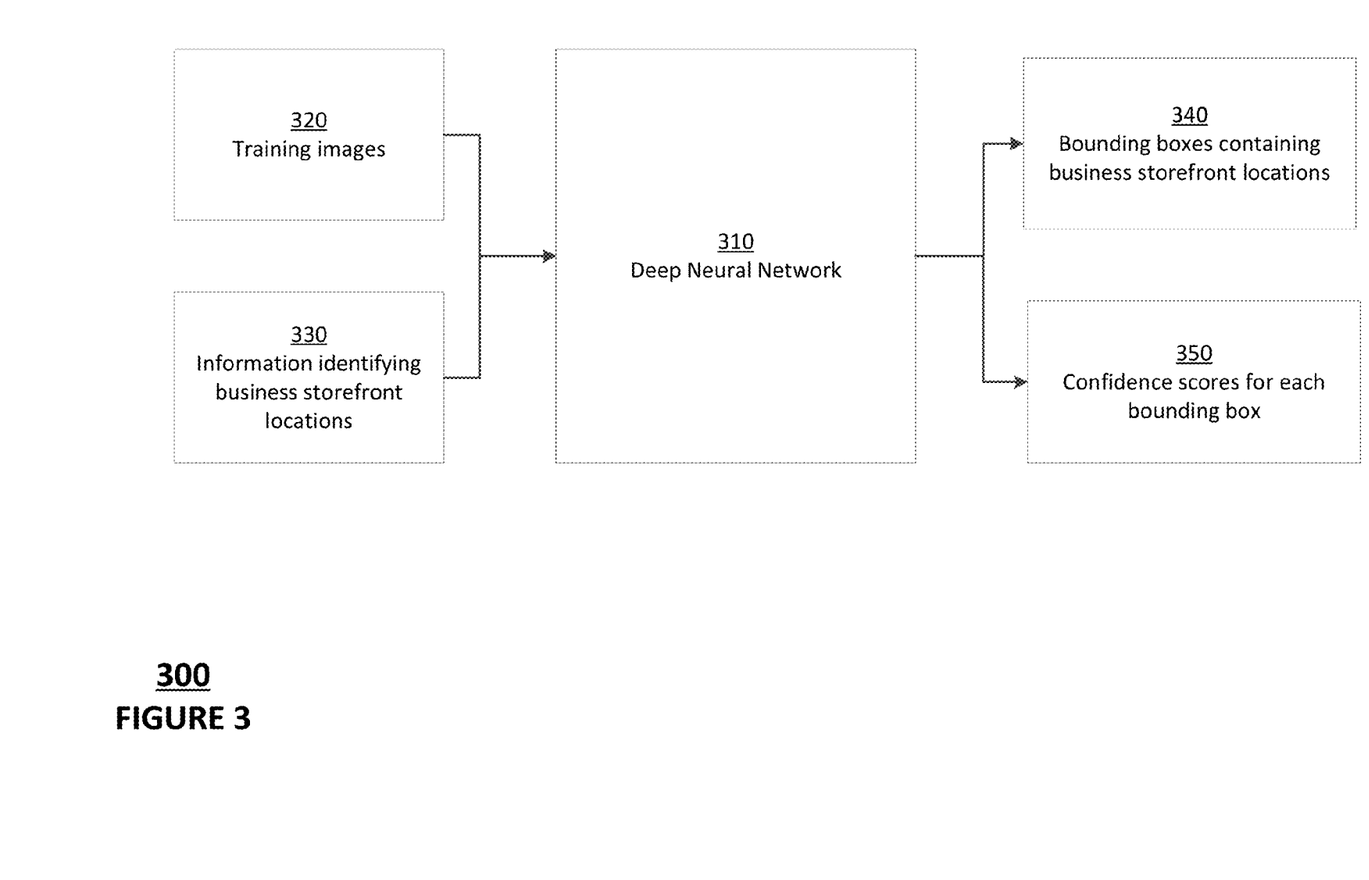
FIG. 3 is an example diagram in accordance with aspects of the disclosure.

As shown in FIG. 3, a deep neural network 310 may be trained to by using a set of training images 320. These training images 320 may include images of storage system 150 that are associated with storefront information identifying one or more business storefront locations 330 in the set of training images. As mentioned above, the storefront information may be a range or ranges of pixels of the image that depict one or more business storefronts located in the associated image.

The deep neural network 310 may be used to evaluate the training images using the business storefront location data for locations of business storefronts within the training images. A coarse sliding window, also called multi-crop evaluation, may be applied to an image using the deep neural network. Each window position may be considered a "crop" of the image. Compared with dense sliding window approaches, the coarse sliding window approach reduces the number of sliding windows by several magnitudes. For example, the coarse sliding window may evaluate 100 windows for a full 360 degree panoramic image instead of the 300,000 windows that the dense sliding window would likely use. Single crop evaluation may also work well, but for high-resolution panoramic images, smaller storefronts cannot be reliably detected from a low resolution version of a single panoramic image. Therefore, using a coarse sliding window may actually enhance the quality of detection of storefronts.

During the training of the deep neural network 310, a first plurality of bounding boxes 340 superimposed on an image may be identified. A bounding box may be a rectangle on an image identifying a portion of the image therein. A bounding box may also be of any other polygon or shape. The shape and size of each bounding box may depend on the shape of each business storefront location.

Each bounding box 340 may be matched with a business storefront location based on the data associated with each image. Only one business storefront location may be enclosed in a single bounding box, such that business storefront locations that are directly next to each other in the image are defined by separate bounding boxes. The matching may involve maximum weight matching, where the edge weight between the business storefront location and a given bounding box is related to the amount of overlap of the boxes. For example, the edge weight may be Jaccard similarity coefficient which is defined as the size of the intersection divided by a size of a union of the given bounding box and the business storefront location.

For a set of training images evaluated by the deep neural network, the deep neural network may be used to determine coordinates of each bounding box of the first plurality of bounding boxes. Coordinates may be image coordinates, such as the image coordinates corresponding to a business storefront location. Image coordinates may be define the location of the bounding box using a coordinate system relative to the image itself or may be latitude/longitude coordinates or any other geolocation coordinates.

A confidence score 350 may be calculated for each bounding box 340. The confidence scores 350 of each bounding box of the first plurality of bounding boxes may represent a likelihood that a bounding box contains an image of a business storefront.

When evaluating a training image, bounding boxes may be removed under certain circumstances. For example, bounding boxes with a confidence score less than a set threshold may be removed. Furthermore, a bounding box that abuts one of the edges of a crop of the image may be removed unless the edge of the crop is also the edge of the image. That way, a bounding box that does not fully contain an object may be removed and the detection of business storefronts is more precise. Furthermore, any bounding boxes that are more than a given distance from any given crop may be removed as well.

The deep neural network 310 may also be trained through post-classification. In preparation for post-classification, an affine transformation may be applied to a receptive field of the deep neural network. In post-classification, the first plurality of bounding boxes identified from the multi-crop evaluation is further classified to refine the results. In other words, another classifier is applied to the results to raise the confidence that each bounding box contains a business storefront location. For example, a second confidence score may be calculated for each bounding box. A probability of a given bounding box containing a business storefront may be calculated based on the calculated confidence scores. The probability may be calculated by summing the products of the confidence scores of each bounding box in the deep neural network and confidence scores of each bounding box in post-classification. Alternatively, the probability may be calculated by multiplying the confidence scores in the deep neural network and in post-classification for a given bounding box.

The probability may be used to filter the first plurality of bounding boxes by removing bounding boxes associated with probabilities that are lower than a set threshold. Also, the probability may be used to rank the bounding boxes. The first plurality of bounding boxes may be filtered based on the ranking. For example, bounding boxes ranked below a set number may be removed.

While being trained, the deep neural network may output the first plurality of bounding boxes 340 on the training images with their respective confidence scores 350. Coordinates determined for each bounding box and probabilities calculated through post-classification may also be included in the output of the network. This information may be stored in storage system 150 for later use.

Figure 4:
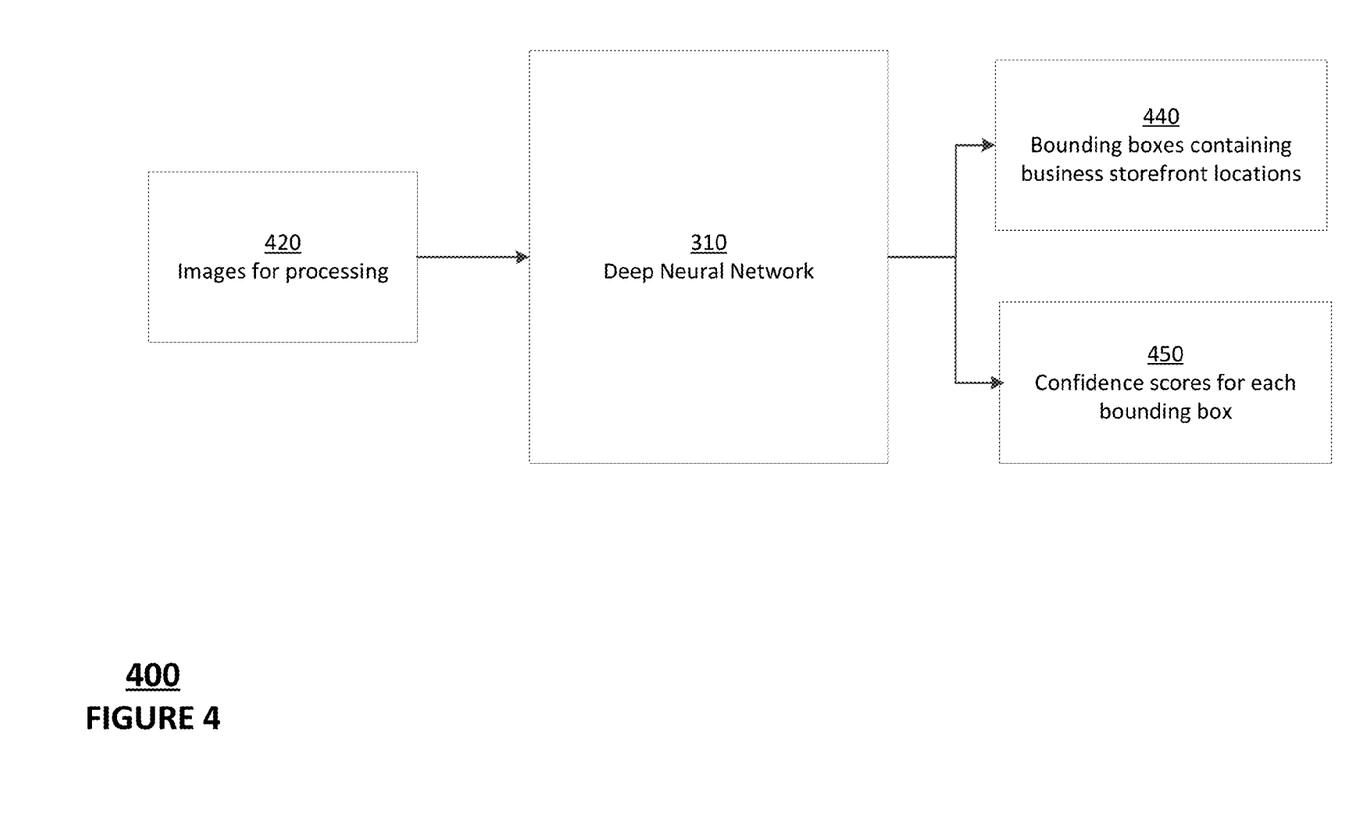
FIG. 4 is another example diagram in accordance with aspects of the disclosure.

After being trained, the deep neural network 310 may evaluate one or more images 420, as shown in FIG. 4. Like the training images 320, images 420 may also be stored in storage system 150. However, unlike the training images, the images 420 may not be associated with data identifying business storefront locations in the images. The images 420 may be panoramic images or images having fields of view greater than 180 degrees, e.g., up to 360 degrees. In addition, the panoramic image may be spherical, or nearly spherical. Detection in a panorama avoids loss of recall that would result in an image with a smaller field of view. Using the deep neural network 310, the images 420 may be evaluated to identify features of the images. As described above with regard to the training, the evaluation may include multi-crop evaluation and post-classification.

Based on the evaluation, the deep neural network 310 may generate a second plurality of bounding boxes 440 identifying possible business storefront locations in the image as shown in FIG. 4. Each bounding box 440 may contain an image of only one business storefront. A row of neighboring business storefronts may therefore be segmented by a plurality of bounding boxes that enclose each business storefront in the row. Additionally, each bounding box 440 may be associated with a confidence score 450 representing a likelihood that each bounding box contains an image of a business storefront.

Figure 5:
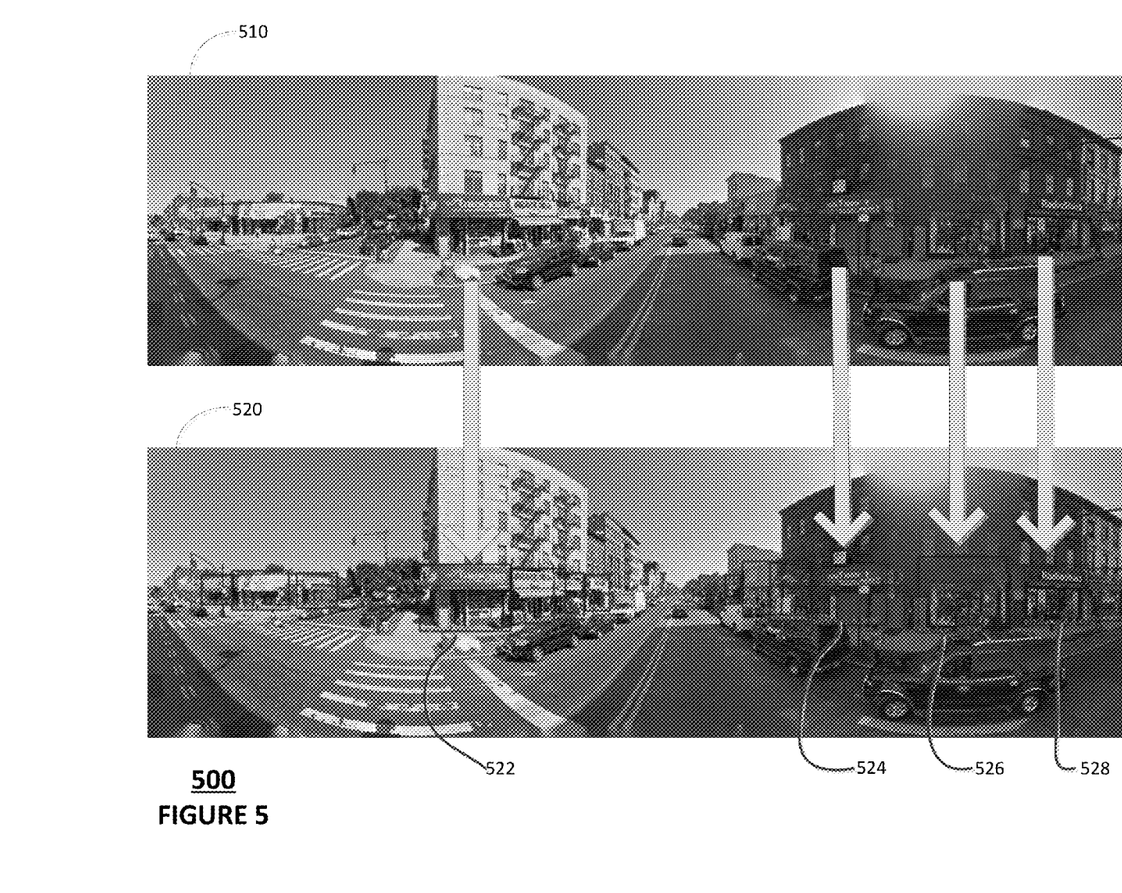
FIG. 5 is an example input and output in accordance with aspects of the disclosure.

As shown in FIG. 5, image 510 may be evaluated by the deep neural network 310. As a result, the deep neural network 310 may identify a plurality of bounding boxes including 522, 524, 526, and 528, each containing an image of an individual business storefront. Images 524, 526, and 528 identify neighboring business storefronts as individual storefronts.

In some examples, the second plurality of bounding boxes 440 may be filtered by removing bounding boxes having confidence scores below a set threshold. Additionally or alternatively, bounding boxes from multiple images associated with same or similar geolocations (or in other words, the same business storefront) may be merged. Merging these bounding boxes may include removing objects that are false positives. An example of a false positive may be a vehicle that is temporarily parked in front of a business storefront.

The filtered bounding boxes may then be associated with the evaluated image and stored in storage system 150 for later use.

Business information within each bounding box 440 may be detected. Known methods of information extraction, such as optical character recognition, may be used. Detected business information may include names, words, logos, merchandise, or other items visible in a given bounding box. The business information may then be added to a database of business information. The database may be stored in storage system 150 for later use.

A user 220, 230, 240 may request business information using a computing device 120, 130, 140. In response to the user request, business information may be retrieved by the computing device 110 from the database in the storage system 150 and sent to the computing device 120, 130, 140.

Figure 6:
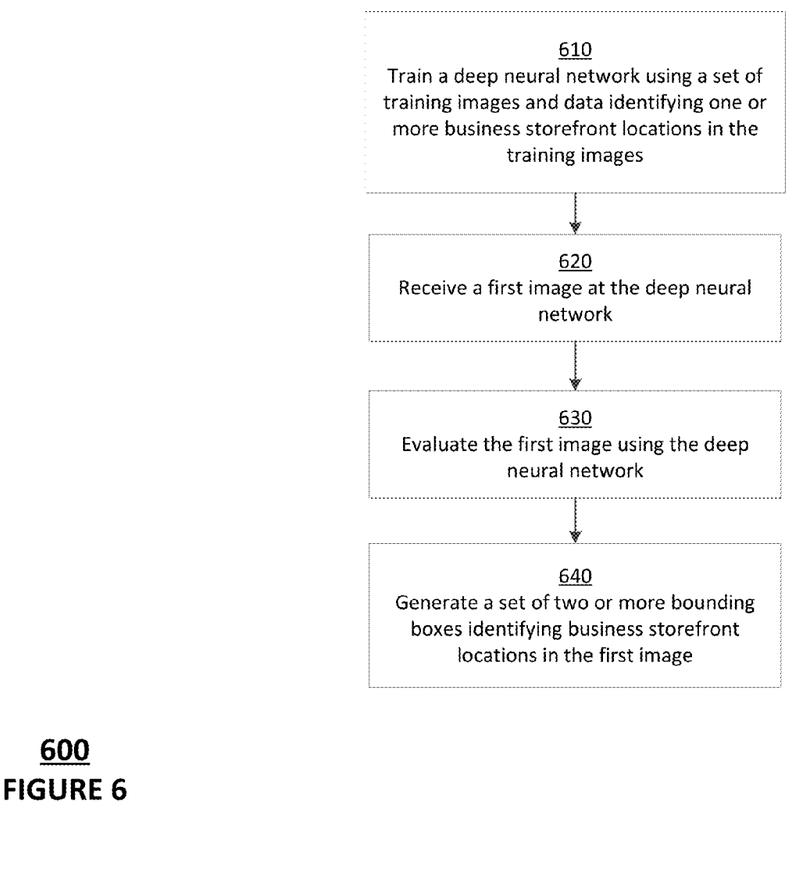
FIG. 6 is an example flow diagram in accordance with aspects of the disclosure.

FIG. 6 is an example flow diagram 600 in accordance with some of the aspects described above that may be performed at the deep neural network 310. However, the features described may be implemented by any of a variety of systems having different configurations. In addition, the operations involved in the methods need not be performed in the precise order described. Rather, various operations may be handled in a different order or simultaneously, and operations may be added or omitted.

At block 610, a deep neural network may be trained using a set of training images and data identifying one or more business storefront locations in the training images. At block 620, a first image may be received at the deep neural network. The first image may be evaluated by the deep neural network at block 630. At block 640, a set of two or more bounding boxes may be generated that identify business storefront locations in the first image.

The features described above may be used to identify storefronts in a large database of images with speed and accuracy unachievable using other methods. Specifically, the features allow for bounding boxes to be the direct output of the analysis, without use of an intermediate output, such as a heat map or a probability map, that requires further analysis and/or processing. Furthermore, the features allow for neighboring business storefronts to be segmented properly instead of being identified as one storefront. Compared with using selective search to generate bounding boxes around images of storefronts, the computational cost for using the method described above is much lower, and the speed is much quicker. Using the above-described method may outperform using a trained heat map approach, which requires extensive post-processing to convert the heat map to meaningful bounding boxes and is more easily affected by label noise. The described method of training and using a deep convolutional neural network automates what would take significant hours of manpower to produce while producing precise results. After the bounding boxes have been produced, the images may be used to automatically extract usable business listings, more precise storefront geolocations, and much more information available in the image.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method comprising:
   training, using one or more computing devices, a deep neural network using a set of training images and data identifying one or more business storefront locations in the training images, the deep neural network outputting a first plurality of bounding boxes on each training image;
   receiving, using the one or more computing devices, a first image;
   evaluating, using the one or more computing devices and the deep neural network, the first image; and
   generating, using the one or more computing devices and the deep neural network, a second plurality of bounding boxes identifying two or more business storefront locations in the first image.

2. The method of claim 1, further comprising:
   detecting, using the one or more computing devices and the deep neural network, business information at each of the identified business storefront locations;
   updating, using the one or more computing devices, a database of business information by adding information from each bounding box in the second plurality of bounding boxes with the business information detected at the business storefront location identified by the bounding box;
   receiving, using the one or more computing devices, a request from a user for business information; and
   retrieving, using the one or more computing devices, the requested business information from the updated database.

3. The method of claim 1, wherein the second plurality of bounding boxes includes two bounding boxes arranged side by side in the first image identifying two discrete business storefront locations.

4. The method of claim 1, wherein training the deep neural network further comprises:
   applying a coarse sliding window on a portion of a given training image; and
   removing one or more bounding boxes based on a location of the portion of the given training image.

5. The method of claim 1, wherein generating the second plurality of bounding boxes further comprises:
   applying a coarse sliding window on a portion of the first image; and
   removing one or more bounding boxes based on a location of the portion of the given training image.

6. The method of claim 1, wherein training the deep neural network further comprises:
   determining a confidence score for each bounding box that represents a likelihood that the bounding box contains an image of a business storefront; and
   removing bounding boxes corresponding to bounding boxes with a confidence score less than a set threshold.

7. The method of claim 1, wherein generating the second plurality of bounding boxes further comprises:
   determining confidence scores for each bounding box that represents a likelihood that the bounding box contains an image of a business storefront; and
   removing bounding boxes locations corresponding to bounding boxes with a confidence score less than a set threshold.

8. The method of claim 1, wherein:
   training the deep neural network further comprises using post-classification; and
   generating the second plurality of bounding boxes further comprises using post-classification.

9. The method of claim 1, wherein generating the second plurality of bounding boxes further comprises:
   calculating a probability of a given bounding box containing a business storefront;
   ranking the second plurality of bounding boxes based on the calculated probability; and
   removing one or more bounding boxes based on the ranking.

10. The method of claim 1, wherein generating the second plurality of bounding boxes further comprises removing objects in the second plurality of bounding boxes that obstructs the view of the identified business storefront locations.

11. The method of claim 1, wherein the training images and the first image are panoramic.

12. A system comprising:
    a deep neural network; and
    one or more computing devices configured to:
      train the deep neural network using a set of training images and data identifying one or more business storefront locations in the training images, the deep neural network outputting a first plurality of bounding boxes on each training image;
      receive, at the deep neural network, a first image;
      evaluate, using the deep neural network, the first image; and
      generate, using the deep neural network, a second plurality of bounding boxes identifying business storefront locations in the first image.

13. The system of claim 12, wherein the one or more computing devices are further configured to train the deep neural network by:
    applying a coarse sliding window on a portion of a given training image; and
    removing one or more bounding boxes based on a location of the portion of the given training image.

14. The system of claim 12, wherein the one or more computing devices are further configured to generate the second plurality of bounding boxes by:
    applying a coarse sliding window on a portion of the first image; and
    removing one or more bounding boxes based on a location of the portion of the given training image.

15. The system of claim 12, wherein the one or more computing devices are further configured to train the deep neural network by:
    determining a confidence score for each bounding box that represents a likelihood that the bounding box contains an image of a business storefront; and
    removing bounding boxes corresponding to bounding boxes with a confidence score less than a set threshold.

16. The system of claim 12, wherein the one or more computing devices are further configured to generate the second plurality of bounding boxes by:
    determining confidence scores for each bounding box that represents a likelihood that the bounding box contains an image of a business storefront; and
    removing bounding boxes locations corresponding to bounding boxes with a confidence score less than a set threshold.

17. The system of claim 12, wherein the one or more computing devices are further configured to:
    train the deep neural network by using post-classification; and
    generate the second plurality of bounding boxes by using post-classification.

18. The system of claim 12, wherein the one or more computing devices are further configured to generate the second plurality of bounding boxes by:
   calculating a probability of a given bounding box containing a business storefront;
   ranking the second plurality of bounding boxes based on the calculated probability; and
   removing one or more bounding boxes based on the ranking.

19. The system of claim 12, wherein the one or more computing devices are further configured to generate the second plurality of bounding boxes by removing objects in the second plurality of bounding boxes that obstructs the view of the identified business storefront locations.

20. A non-transitory, tangible computer-readable storage medium on which computer readable instructions of a program are stored, the instructions, when executed by one or more computing devices, cause the one or more computing devices to perform a method, the method comprising:
   training a deep neural network using a set of training images and data identifying one or more business storefront locations in the training images, the deep neural network outputting a first plurality of bounding boxes on each training image;
   receiving, at the deep neural network, a first image;
   evaluating, using the deep neural network, the first image; and
   generating, using the deep neural network, a second plurality of bounding boxes identifying business storefront locations in the first image.

* * * * *